United States Patent [19]

Reade

[11] 3,926,838

[45] Dec. 16, 1975

[54] TRANSPARENT, CRYSTALLINE, CATHODOLUMINESCENT MATERIALS

[75] Inventor: Richard F. Reade, Corning, N.Y.

[73] Assignee: Corning Glass Works, Corning, N.Y.

[22] Filed: Dec. 9, 1974

[21] Appl. No.: 530,812

[52] U.S. Cl. ........ 252/301.4 F; 106/39.6; 106/39.7; 313/469
[51] Int. Cl.² ......................................... C09K 11/08
[58] Field of Search ............ 252/301.4 F; 106/39.6, 106/39.7

[56] References Cited
UNITED STATES PATENTS

| | | | |
|---|---|---|---|
| 3,275,493 | 9/1966 | MacDowell | 106/39.6 |
| 3,282,711 | 11/1966 | Lin | 106/39.7 |
| 3,843,551 | 10/1974 | Muller et al. | 252/301.4 F |

*Primary Examiner*—Helen M. McCarthy
*Attorney, Agent, or Firm*—Clinton S. Janes, Jr.; Clarence R. Patty, Jr.

[57] ABSTRACT

The instant invention relates to the production of transparent, crystalline materials which exhibit strong luminescence when excited by cathode rays. The invention is particularly concerned with glass compositions within the $MgO-Al_2O_3-SiO_2$ system activated with manganese which, when subjected to very specifically-defined heat treatments, will develop an integral transparent surface layer of cathodoluminescent crystallization in situ, thereby recommending their utility in such applications as a cathode ray tube faceplate.

2 Claims, No Drawings

TRANSPARENT, CRYSTALLINE, CATHODOLUMINESCENT MATERIALS

The phenomenon of cathodoluminescence, viz., luminescence exhibited by a material when subjected to excitation by cathode rays, has been long recognized. Hence, the television industry is founded upon this phenomenon which results from the bombardment of high energy electrons on certain phosphors which are deposited on a glass face plate.

Crystalline phosphors have been used essentially exclusively because of their high performance and resistance to aging. However, several features inherent in the use of crystalline phosphors have sparked continuing research to provide a better product. Thus, the conventional process of depositing the phosphor layer on face plate tends to cause agglomeration and, hence, a non-uniform film. Furthermore, since the layer of phosphor is simply laid down on the face plate, bonding means must be provided as well as mechanical protection therefor. Moreover, the depositing process itself is a separate step which must be undertaken in the stream of production. Finally, the crystalline phosphors lack transparency and cause a scattering and reflection of emitted light.

Because of those factors, considerable interest has been evinced in glass bodies which will luminesce when subjected to cathode rays. The cathodoluminescence of a glass body is intrinsic thereto such that the above-noted problems regarding crystalline phosphors are avoided. Unfortunately, however, although glasses demonstrating cathodoluminescence have been developed, their efficiency has not been as great as that exhibited by crystalline materials and, in numerous instances, the resistance to aging when exposed to long term electron bombardment has proven far from adequate.

U.S. application Ser. No. 470,836, filed May 17, 1974 by the present applicant, provides a brief background regarding glasses exhibiting luminescence when exposed to ultraviolet radiations and cathode rays. The application discloses a group of cathodoluminescent glasses having compositions in the alkaline earth aluminosilicate system activated by manganese. These latter compositions demonstrate exceptional luminescence efficiency and aging resistance when compared with previously-produced glass bodies.

The instant invention is founded upon glass compositions within the magnesium aluminosilicate field activated with manganese which, when subjected to a particularly-defined heat treatment schedule, will develop mu-cordierite crystallites in situ within a surface layer on the glass body. Mu-cordierite has the nominal formula $2MgO.2Al_2O_3.5SiO_2$ but exhibits a lattice structure more similar to that of beta-quartz than that of conventional cordierite. Heat treatment of sufficient length to cause the development of crystals throughout the glass body will customarily cause wrinkling and distortion of the surface. Ultimately, an opaque body will result. Therefore, only the minimum heat treatment necessary to produce a surface crystalline layer of several microns thickness is required. Such a layer can have utility as a screen for a cathode ray tube face plate. The screen surface comprises a thin layer of manganese-doped mu-cordierite crystals which, being developed in situ, is integrally bonded to the underlying substrate glass thereby furnishing a durable, abrasion resistant screen. The screen is transparent due to the extremely small size of the crystallities and the fact that the index of refraction thereof closely approximates that of the glass. Thus, the light scattering and reflecting effects inherent with crystalline structure are minimized. In sum, the surface crystallized layer can be free of imperfections or distortions and visually indistinguishable from the parent glass.

The glasses of the instant invention consist essentially, on a molar basis in terms of oxide content, of about 2–2.4 MgO, 1–1.3 $Al_2O_3$, and 2–5 $SiO_2$. Such values correspond approximately, on a weight percent basis, to about 8–16% MgO, 27–40% $Al_2O_3$, and 44–63% $SiO_2$. At least about 0.25% by weight manganese, expressed as MnO, is required for significant activation. Amounts in excess of 2% MnO show effectiveness but the performance properties are not materially different from products containing lesser amounts.

At least 44% $SiO_2$ has been found necessary to avoid premature devitrification during melting, but amounts in excess of about 63% have inhibited the formation of mu-cordierite crystals. At least about 8% MgO is demanded to produce mu-cordierite crystals, but greater than about 16% MgO hazards opalization of the glass. The operable range of $Al_2O_3$ is defined by practical glass melting capability.

Additions of up to about 3% $ZrO_2$ appear to be useful in accelerating crystallization, but excessive amounts precipitate in the body as zirconia crystals. Additions of $Li_2O$ up to about 1% can be helpful in reducing the temperature required for crystallization. However, greater amounts hazard the development of unwanted crystallization during the heat treatment process. Additions of SnO up to about 0.5% and/or chloride ion in amounts up to about 1% inhibit the formation of trivalent manganese ion ($Mn^{+3}$) whose presence imparts an unwanted violet or violet-brown hue to the body. The inclusion of fluoride appears to diminish the cathodoluminescence intensity of the final product, but up to about 2% can be tolerated as a melting aid.

In general, the presence of other components is not only unnecessary but also undesirable. For example, the alkali metal oxides other than $Li_2O$ and the alkaline earth metal oxides other than MgO appear to retard surface crystallization, when compared with the simple ternary $MgO—Al_2O_3—SiO_2$. PbO seems effective in lowering the temperature for crystallization but is less efficient than $Li_2O$ in this respect. Other heavy metal oxides such as $La_2O_3$ and $Ta_2O_5$ likewise appear to retard the development of the mu-cordierite surface crystallization.

Table I records glass composition, expressed in weight percent on the oxide basis, suitable for the present invention. The actual batch ingredients therefor can comprise any materials, either oxides or other compounds, which, when melted together, will be converted into the desired oxide in the proper proportions. In each example the batch ingredients were compounded, ballmilled together to assist in achieving a homogeneous melt, and deposited within a platinum crucible. Thereafter, the crucible was inserted into an electrically-fired furnace operating at 1600°–1675°C. and held at that temperature for about 6–16 hours. The melt was poured into a steel mold to yield a slab about 10 × 4 × ¼ inches and the slab then transferred to an annealer operating at 750°–800°C.

TABLE I

|  | 1 | 2 | 3 | 4 | 5 | 6 | 7 | 8 | 9 | 10 | 11 |
|---|---|---|---|---|---|---|---|---|---|---|---|
| $SiO_2$ | 44.74 | 50.35 | 50.85 | 50.70 | 50.90 | 50.75 | 55.73 | 55.00 | 62.14 | 60.92 | 62.62 |
| $Al_2O_3$ | 39.86 | 33.25 | 33.91 | 33.81 | 33.94 | 33.84 | 31.52 | 30.17 | 27.16 | 27.82 | 28.34 |
| MgO | 15.01 | 12.75 | 14.58 | 14.16 | 14.21 | 13.79 | 12.09 | 11.93 | 10.05 | 9.75 | 8.40 |
| MnO | 0.40 | 1.31 | 0.67 | 1.33 | 0.67 | 1.33 | 0.66 | 0.65 | 0.65 | 0.65 | 0.64 |
| $Li_2O$ | — | — | — | — | 0.28 | 0.28 | — | — | — | — | — |
| $ZrO_2$ | — | 2.27 | — | — | — | — | — | 2.26 | — | — | — |
| SnO | — | 0.06 | — | — | — | — | — | — | — | — | — |
| $MgCl_2$ | — | — | — | — | — | — | — | — | — | 0.87 | — |

Table II reports various heat treatments applied to the glasses of Table I which provided surface layers containing mu-cordierite crystals, as identified through X-ray diffraction analyses. A visual characterization of the surface quality of each slab is provided along with a visual description of cathodoluminescence resulting from the impingement of electrons at energies up to 11 kil volts. Except where noted as glassy, all comments apply to transparent, crystalline, mu-cordierite surfaces.

In carrying out the heat treatment, the slabs were placed in an electrically-fired furnace and heated at furnace rate to the cited temperature. After the specified dwell time, the electric current to the furnace was cut off and the furnace allowed to cool with the slab retained therein.

925°C. has been deemed a practical maximum for the range of glasses encompassed within this invention and, as can be seen from Table II, the lower silicacontaining glasses normally cannot be heated to such a temperature without deforming. Therefore, a preferred heat treating schedule will involve temperatures between about 860°–890°C.

As can be appreciated, the depth of crystallization developed is a function of time and temperature. In general, this phenomenon appears to approximate the law of diffusion, i.e., the depth of crystallization varies with the square root of time at constant temperature. Therefore, whereas as brief a period of time as one hour will yield a recognizable amount of crystallization, to achieve a depth of layer sufficient to effectively intercept the most energetic incident electrons and

TABLE II

| Example | Heat Treatment | Surface Quality | Cathode-Color |
|---|---|---|---|
| 1 | 850°C. for 16 hours | Glassy-no crystals | Yellow-orange |
| 1 | 865°C. for 16 hours | Partially crystalline | Minor orange tint |
| 1 | 880°C. for 16 hours | Fair, few wrinkles | Good orange |
| 1 | 900°C. for 16 hours | Badly distorted | Good orange |
| 2 | 880°C. for 16 hours | Good | Vivid red-orange |
| 3 | 850°C. for 16 hours | Partially crystalline | Minor orange tint |
| 3 | 865°C. for 16 hours | Good | Strong red-orange |
| 3 | 880°C. for 16 hours | Badly wrinkled | Strong red-orange |
| 4 | 850°C. for 16 hours | Partially crystalline | Minor orange tint |
| 4 | 865°C. for 16 hours | Good | Strong red-orange |
| 4 | 880°C. for 16 hours | Badly wrinkled | Strong red-orange |
| 5 | 850°C. for 16 hours | Good | Strong red-orange |
| 5 | 880°C. for 16 hours | Deformed, cracked | Good orange |
| 6 | 850°C. for 16 hours | Good | Strong red-orange |
| 6 | 880°C. for 16 hours | Deformed, cracked | Good orange |
| 7 | 880°C. for 16 hours | Good | Good orange |
| 7 | 900°C. for 16 hours | Badly wrinkled | Good orange |
| 8 | 880°C. for 16 hours | Fair, few wrinkles | Good orange |
| 9 | 900° C. for 16 hours | Good | Good orange |
| 10 | 900°C. for 16 hours | Good | Good orange |
| 11 | 900°C. for 16 hours | Good | Fair orange |
| 11 | 920°C. for 16 hours | Badly wrinkled | Good orange |

As can be seen from Table II, the heat treatment schedule is extremely critical to assure maximum transparency and cathodoluminescence together with minimum distortion of the crystalline surface or the underlying glass. Desirably, the surface-crystallized material is free from imperfections or distortions and is visually indistinguishable from the parent glass.

The crystallization step involves a time-temperature relationship. Hence, the rate of crystal development can be much greater at higher temperatures. However, higher temperatures hazard deformation and distortion of the glasses so a balance must be struck between exposure time and temperature to secure surface-crystallized articles free from surface imperfections and wrinkling resulting from exposure to excessive teperatures for too long periods of time. In general, as is shown in Example 1, temperatures greater than 850°C. are required to cause the growth of mu-cordierite crystals. Glasses containing higher silica levels require higher crystallization temperatures. However, about produce a highly intense cathodoluminescence, a minimum period of about four hours has been found necessary. Very long periods of high temperature treatment will, of course, result in deep layers of crystallization or even total crystallization throughout the body, and will also customarily produce opaque bodies with distorted surfaces. Moreover, the intensity of cathodoluminescence does not seem to significantly improve. Hence, the preferred heat treating schedule will utilize about 8–24 hours at temperature to obtain a surface crystallized layer only.

Examples 2–6 closely approximate the stoichiometry of cordierite, $2MgO.2Al_2O_3.5SiO_2$, and, when properly heat treated, appear to produce the most desirable combination of strong, saturated, red-orange cathodoluminescence together with good surface quality.

The degree of crystallinity in the surface layer will vary, i.e., the amount of crystallization becomes less in the interior of the body. However, near the surface of the body, the mu-cordierite can constitute over 50% by value of the product. This high percentage of crystallization gives rise to the highly intense cathodoluminescence displayed by articles of the present invention.

The thickness of the crystallized surface layer on the body need only be enough to exceed the depth to which the electrons will penetrate when the body is exposed during use. The limit of penetration has been defined as that depth beyond which negligible power is transmitted. An approximation of that limit can be calculated from Terrill's equation $$\text{Penetration Limit (in cm.)} = \frac{2.5 \times 10^{-12} V^2}{d}$$

where V is the electron accelerating potential in volts and $d$ is the density of the solid in g/cm$^3$. Based upon this equation, when a solid having a density of 2.5 g/cm$^3$ is exposed to electrons at a voltage of 15 kilovolts (KV), the penetration limit is about two microns. When a like body is exposed to electrons at 25 KV, the limit is about 6 microns.

The present crystallized surface layers containing mu-cordierite exhibit a density in the near vicinity of 2.5. As is shown in Table II, Example 2, after being surface-crystallized at 880°C. for 16 hours, demonstrates a strong red-orange cathodoluminescence with a peak emission at about 650 millimicrons, when exposed to electrons at 15 KV. However, when subjected to electrons at 25 KV, the resulting luminescence is slightly less red with a peak at about 640 millimicrons. This phenomenon would suggest that at 25 KV the penetration limit, about 6 microns, is slightly greater than the effective thickness of the crystallized surface such that a small contribution from the underlying, yellow-emitting, glass substrate is being observed.

A discussion of Terrill's equation and the relation thereof to penetration limit can be found in *An Introduction to Luminescence of Solids*, H.W. Leverenz, Dover Publications, Inc., New York City, 1968, pp. 156–159. It can be appreciated that various modifications in heat treatment parameters within the above-prescribed time-temperature limitations can be advantageous. As illustrative of that fact, Examples 2, 6, and 7 were heated from room temperature to 850°C. at 200°C./hour in a furnace having a nitrogen atmosphere and maintained at that temperature for four hours. Thereafter, the glasses were heated at the same rate to 900°C. and held thereat for six hours. Finally, the glasses were cooled to room temperature inside the furnace. The crystallized surface layer of each sample exhibited a very intense red-orange cathodoluminescence when exposed to electrons at 11 KV. Examination of the sample surfaces with a 14 power hand lens disclosed only the slightest indication of surface imperfection. The inert atmosphere provided by the nitrogen aids in inhibiting the oxidation of $Mn^{+2}$ ions at the surface to $Mn^{+3}$ ions and appears to promote enhanced cathodoluminescence, when compared with firing in air or other oxidizing atmosphere. Other inert gas atmospheres, e.g., helium and argon, can be utilized with similar effects.

U.S. Pat. No. 3,300,670 discloses the manufacture of glass articles having integral surface layers containing various crystals which can exhibit cathodoluminescence, wherein the crystals are formed in situ through the heat treatment of the glass body. Such structures are described as being particularly suitable for the face plate of cathode ray tubes. The products of the present invention differ in at least two fundamental respects from those of that patent. First, the base glass compositions recorded therein are different from those of the instant invention. Second, the several crystal phases reported therein do not include mu-cordierite which can provide a vivid orange-to-red cathodoluminescence.

I claim:

1. A transparent glass body exhibiting cathodoluminescence having at least an integral surface layer comprising divalent manganese doped mu-cordierite crystals homogeneously dispersed within a glassy matrix, said glass body consisting essentially, by weight on the oxide basis, of about 8–16% MgO, 27–40% $Al_2O_3$, 44–63% $SiO_2$, and 0.25–2% MnO, wherein said crystals are visually indistinguishable from the parent glass and constitute at least 50% by volume of the crystallized surface portion of said body.

2. A glass body according to claim 1 also containing up to 3% $ZrO_2$, up to 1% $Li_2O$, up to 0.5% SnO, and/or up to 1% chloride.

* * * * *